United States Patent [19]
Milano

[11] 3,935,810
[45] Feb. 3, 1976

[54] POUCHES

[75] Inventor: Gerard M. Milano, Glen Ellyn, Ill.

[73] Assignee: Arvey Corporation, Chicago, Ill.

[22] Filed: Nov. 30, 1973

[21] Appl. No.: 420,617

Related U.S. Application Data

[60] Division of Ser. No. 221,982, Jan. 31, 1972, which is a continuation-in-part of Ser. No. 69,670, Sept. 4, 1970, abandoned.

[52] U.S. Cl. .................. 99/467; 206/389; 206/525; 229/3.5 MF; 229/53; 426/113
[51] Int. Cl.² ................. B65D 79/00; B65D 85/67; B65D 85/72; B32B 7/14
[58] Field of Search .......... 206/389, 390, 525, 526; 229/3.5 MF, 53, DIG. 14; 426/113; 99/467

Primary Examiner—William T. Dixson, Jr.
Attorney, Agent, or Firm—Dressler, Goldsmith, Clement & Gordon, Ltd.

[57] ABSTRACT

A method of simultaneously producing a plurality of plural walled members by applying localized areas of adhesive to a first continuous web of one material, feeding a second continuous web of material in superposed relation to the first web with the adhesive located between the webs, pressing the webs into engagement with each other to adhere the webs along at least some of localized areas of adhesive, severing the adhered webs along spaced lines to produce a plurality of plural walled members capable of being transformed into pouches.

4 Claims, 9 Drawing Figures

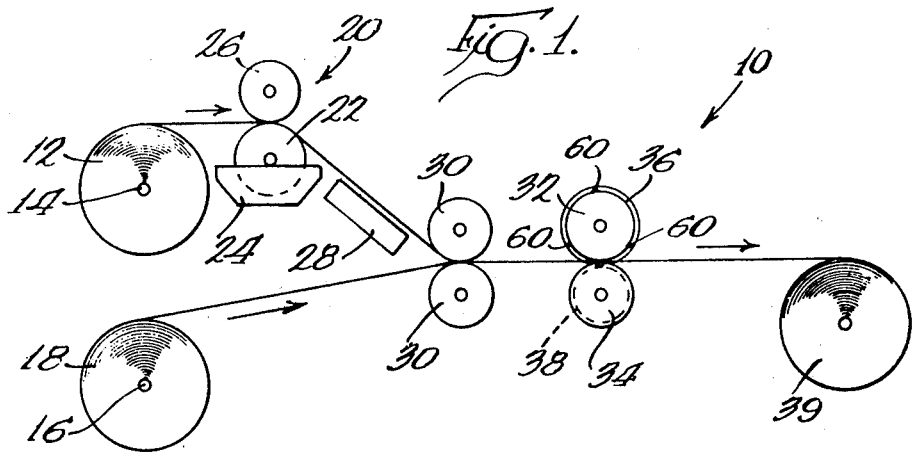
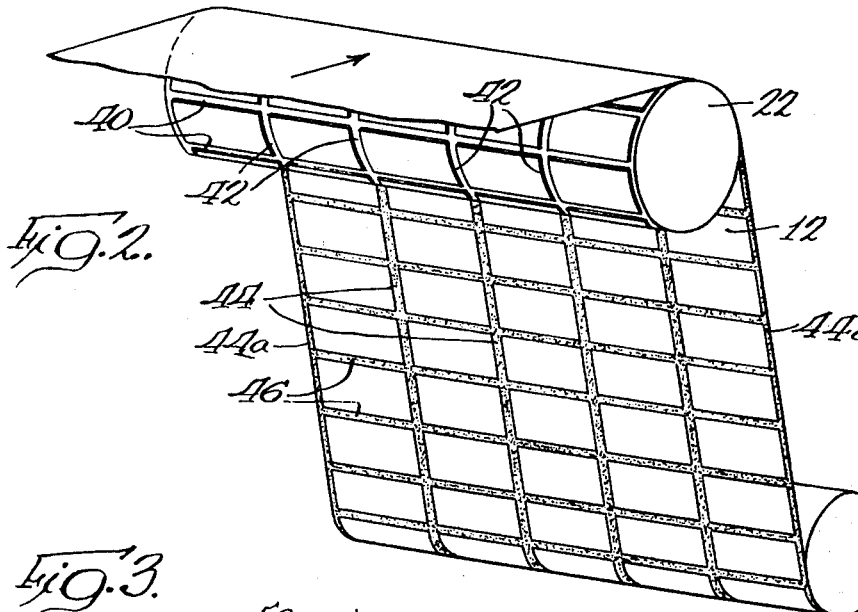
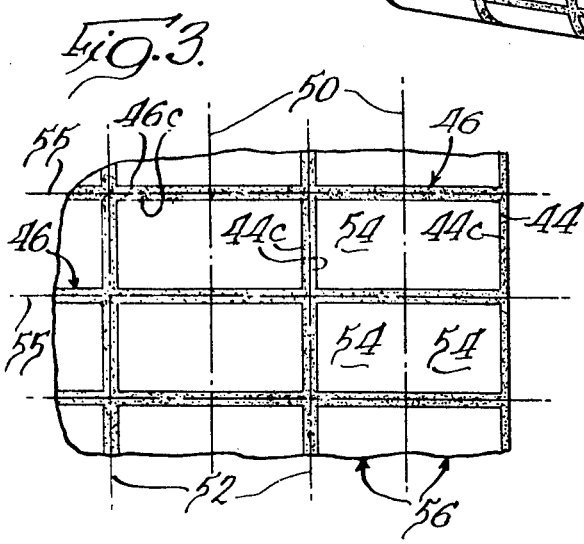
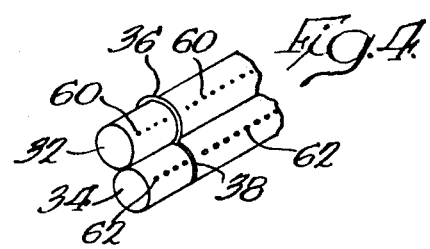

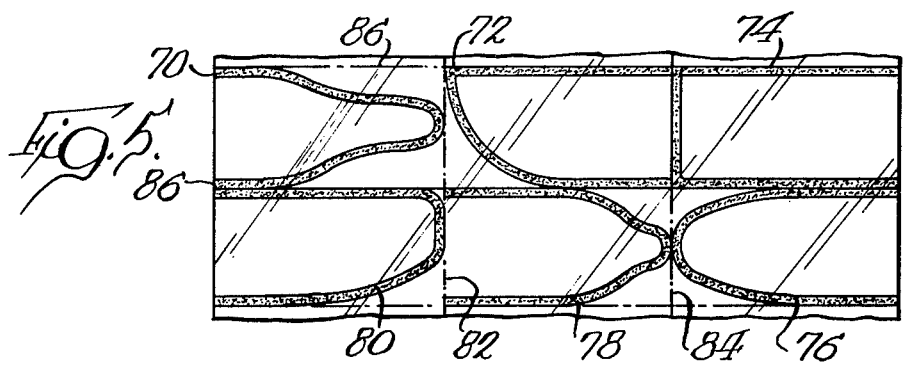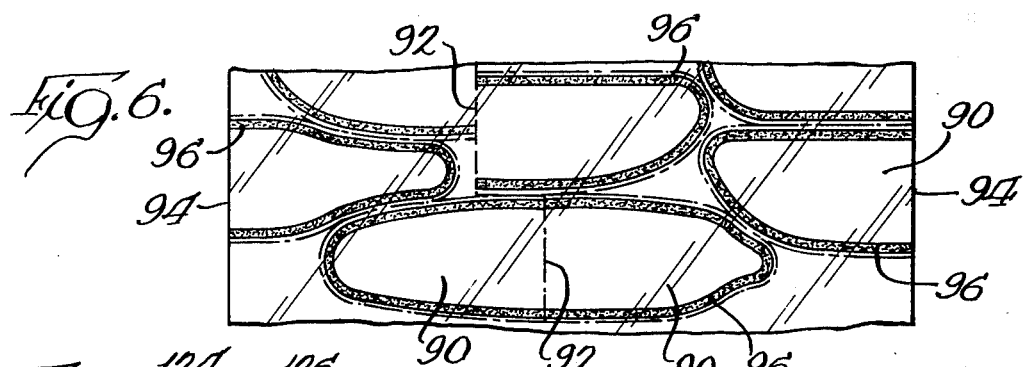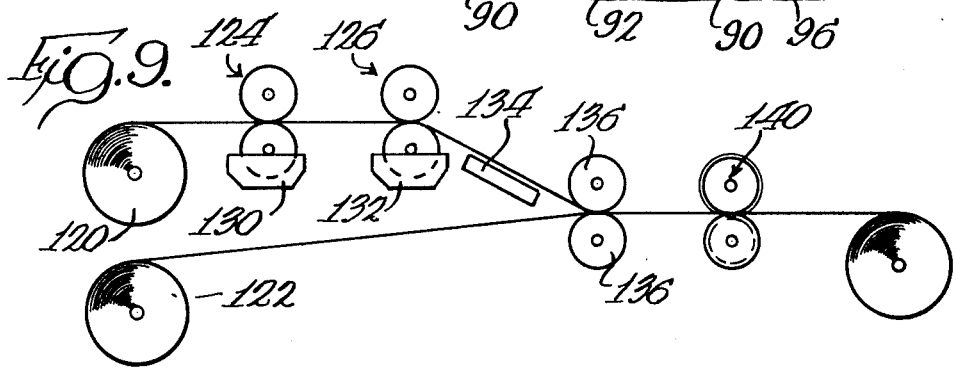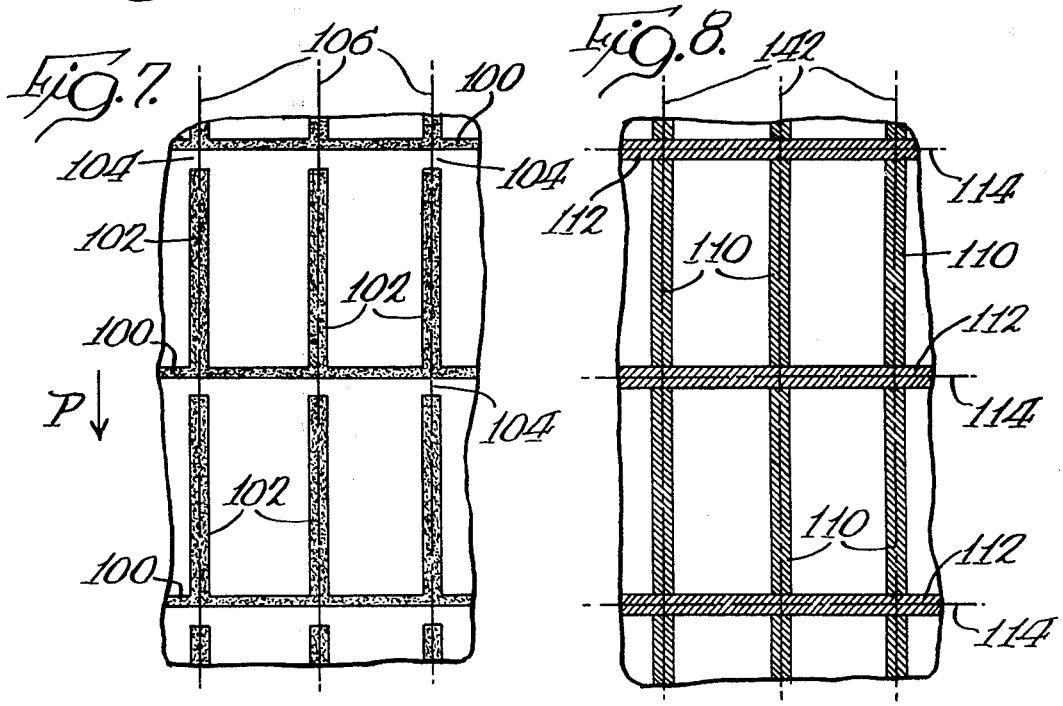

3,935,810

POUCHES

REFERENCE TO RELATED APPLICATIONS

This is a division, of application Ser. No. 221,982, filed Jan. 31, 1972 which application Ser. No. 221,982 is a continuation-in-part of application Ser. No. 69,670, filed Sept. 4, 1970, now abandoned.

BACKGROUND OF THE INVENTION

The present invention relates generally to pouches and more particularly to an improved method of making pouches.

In recent years, the packaging industry has made extensive use of pouches for packaging various articles. For example, pouches are now extensively used in packaging frozen food products. A pouch of the type herein referred to, consists of two webs of material which are joined along the peripheral edges. The webs will define the pouch side walls while the joined peripheral edges of the side walls define fins.

The normal procedure for making pouches is to join two side walls of material together by a heat sealing process. This procedure requires that at least one of the side walls be of a physical character which can be joined to the other side wall by heat and pressure. If this characteristic is lacking, at least one surface of one of the side walls must be modified to incorporate heat sealing characteristics. This is usually done by laminating a suitable film to the sheet forming one side wall an coating the wall to allow the two side walls to be joined by the heat sealing process.

Thus, webs which do not have heat sealing characteristics are not considered suitable for pouch making since it requires the application of a film or coating to a surface of the material thereby increasing the cost thereof. Another proble encountered in present method of making pouches is that the maximum output of a pouch making machine is severely restricted by the time required for increasing the temperature of the material sufficiently to heat seal the two side walls or webs together.

Even if the additional expense of applying a film or coating or heat sealable material, such as polyethylene treated to incorporate heat sealing properties is justified, a pouch formed in this manner has several undesirable characteristics. For example, coating the entire surface of one of the side walls with a heat sealable material, requires that the contents of the pouch be in contact with the heat sealing film or coating. In addition, the film of heat sealing material, in many instances, will decrease the permeability of the side wall thereby increasing the time required for sterilization of the contents after being placed in the package, which is required for many packaged materials. Also, a large quantity of heat sealing coating or film is applied when in actuality only a small portion thereof is needed.

SUMMARY OF THE INVENTION

The present invention comtemplates a method for making pouches which removes the normal restriction of having one pouch side wall of the pouch heat sealable and is capable of producing pouches at a speed greater than previously known methods could accomplish while doing so at considerably less cost. Furthermore, the process of the present invention permits the formation of pouches from different or dissimilar materials for the side walls and of different configurations.

According to the invention, a plurality of plural walled members are simultaneously formed from two webs of material by applying a layer of adhesive to a predescribed pattern onto one surface of one of the webs and superimposing a second web onto the imprinted web. The two webs are then adhered to each other by pressing the sheets together using, for example, cooperating contact pressure rollers. In the same pouches, the adhered or bonded webs are severed at spaced locations to simultaneously form a plurality of plural walled members.

According to one aspect of the invention, a plurality of ribbons are simultaneously formed from a pair of webs with each of the ribbons capable of being severed transversely at longitudinally spaced locations to produce a plurality of pouches. The pouches may either be previously continuously formed in the ribbons or may be formed around prescribed patterns that are interconnected after the articles have been inserted. In one instance, a roller having longitudinal and transversely extending adhesive receiving patterns thereon, is immersed in a liquid adhesive to transfer the adhesive to one of the webs. Thereafter, the second web is connected to all of the adhesive areas and the webs are severed longitudinally of the path of movement between opposite edges of each of the longitudinally extending patterns of adhesive and also between adjacent edges of adjacent patterns of adhesive to simultaneously produce a plurality of ribbons each having pouches formed therein that are opened towards one lateral edge of the ribbon.

In another embodiment of the rectangular pouches, the adhesive patterns again form rectangular pouches with the open ends of the pouches located between opposite edges of of the ribbons and the longitudinally extending adhesive patterns are interrupted adjacent one edge of each of the transverse adhesive patterns. In this embodiment, the individual pouches can be severed from the ribbon by severing along the interrupted or unadhered areas of the ribbons.

In the further embodiment of rectangular pouches, the longitudinally extending adhesive patterns are first adhesive means that adhere in response to pressure while the transversely extending patterns are a heat sensitive coating or means, responsive to heat and pressure so that the webs are initially adhered only along the first adhesive means when pressure is applied by the pressure rollers and may be subsequently transformed into individual sealed pouches by utilizing the heat sensitive adhesive coating for adhering the webs transversely of the ribbons.

According to a further aspect of the invention, the adhesive patterns may also take the form of irregular shapes conforming to various food products, such as meats and pastries.

In one specific embodiment of irregular patterns, the irregular shapes of pouches are formed so that the webs can be severed along transversely spaced lines extending generally parallel to the path of the moving webs so that a plurality of ribbons are formed, each having a plurality of different shapes of pouches formed therein. In this instance, the webs may be scored or other wise deformed so that the ribbons can be severed into individual pouches generally around the configuration of the pouch. Alternatively the ribbons can be scored along lines extending perpendicular to the opposite edges to form the individual pouches. In the further embodiment of irregular shaped pouches, each pouch is individually severed from the webs around the periphery of each adhesive pattern so that the pouch configuration conforms generally to the configuration of the article to be inserted therein.

In all embodiments of the invention, the localized areas of adhesive are applied to one surface web, moving along a path, by at least one rotating roller that has predetermined adhesive receiving patterns located thereon and immersed in a liquid adhesive. Thereafter, the second web of material is fed to the path and the superposed webs are moved between a pair of cooperating contact rollers to adhere the web at the localized areas of adhesive. Subsequently, the adhered webs are slit either along parallel lines extending longitudinally of the path and weakened transversely of the path to produce a plurality of ribbons or alternatively, the individual pouches may be completedly severed by cutting around the periphery of each adhesive pattern.

The present system or process will considerably increase the output production of normal pouch making machinery since the time lag for heating the material to a bonding or sealing temperature is no longer necessary. In addition, the present process readily allows for the formation of pouches from two different materials whose side walls are non-compatible in terms of heat sealability, such as foil of aluminum and a polyester film.

BRIEF DESCRIPTION OF THE SEVERAL VIEWS OF DRAWINGS

FIG. 1 illustrates apparatus that can be used for producing several of the embodiments of pouches;

FIG. 2 is a fragmentary view of one of the webs of FIG. 1 with strips of adhesive thereon;

FIG. 3 is a fragmentary plan view of the webs in the adhere condition;

FIG. 4 is a fragmentary prespective view of a portion of the apparatus illustrated in FIG. 1;

FIG. 5 is a view similar to FIG. 3 showing a modified form of adhesive pattern for adhereing the two webs;

FIG. 6 is a further modified form of adhesive patterns that can be produced between the webs;

FIG. 7 is a still further modified form of adhesive patterns that can be produced between the webs;

FIG. 8 is a view similar to FIG. 7 showing still a further modified form of adhesive patterns between two webs; and FIG. 9 is an illustration of apparatus for producing the adhesive pattern shown in FIG. 8.

DETAILED DESCRIPTION

While this invention is susceptible of embodiment in many different forms there is shown in the drawings and will herein be described in detail several specific embodiments, with the understanding that the present disclosure is to be considered as exemplification of the principles of the invention and is not intended to limit the invention to the embodiments illustrated.

The apparatus 10 for performing the method of the present invention is schematically illustrated in FIG. 1 and includes a first continuous supply of a first web 12 supported on a roller 14 and a second roller 16 also having a continuous web 18 thereon.

The apparatus 10 further includes means 20 for applying spaced localized areas of adhesive to web 12. In the illustrated embodiment, the means for applying the adhesive to the web 12 has been illustrated as a rotogravure which includes an adhesive roller 22 having an etched design, as will be explained later. Generally speaking, the roller 22, cooperating with a trough 24 having adhesive therein, is capable of applying spaced localized areas of adhesive to the web 12 by cooperating with a back up roll 26. However, it will be appreciated that other methods, such as flexographic, may be used for applying adhesive. The adhesive is preferably a solvent or water based adhesive or adhesive means responsive to pressure when the solvents are driven off.

The web 12 is fed along a predetermined path between the rollers 22 and 26 and a dryer or oven 28 is located adjacent the path to drive off all of the solvents included in the adhesive so that the adhesive means has sufficient tack to cause adhesion to by mere application of pressure when the second web 18 is fed to the path and pressed into engagement with the first web 12. The apparatus for pressing the sheets together includes a pair of cooperating contact pressure rollers 30 which are located on opposite sides of the path for web 12 and press the two webs into engagement with each other to adhere the webs at the localized areas of adhesive means applied by the means 20.

The adhered webs are then passed between a further pair of cooperating rollers 32 and 34 which are capable of severing or slitting the adhered webs along spaced generally parallel lines to produce a plurality of ribbons, as will be described later. For illustrative purposes only, the severing or cutting means has been shown as knife edges 36 on roller 32 with the knife edges cooperating with recesses 38 formed in the second roller 34.

The adhered webs in each of the ribbons thus produce the side walls for a plurality of pouches, and may be suitably wound onto rolls 39 for shipment and/or storage.

In the embodiment illustrated in FIGS. 2 and 3, rectangular pouches are formed which have a pair of side walls that have fins of equal width along only three edges thereof and are unsecured along a fourth edge. For this purpose, the adhesive application roller 22 has a first group of circumferentially spaced axially extending parallel etched areas or adhesive receiving patterns 40 to which adhesive is applied from the trough or container 24. The adhesive application roller 22 also has a second group of axially spaced circumferentially extending parallel etched areas or adhesive receiving patterns 42 to which adhesive is applied.

Thus, when the web 12 is continuously fed along a path between the rollers 22 and 26, the adhesive applying means 20 will produce adhesive patterns to the surface of the webs that include a first group of parallel strips of adhesive means 44 which are spaced transversely of the path and extend longitudinally thereof and an intersecting second group of parallel strips of adhesive means 46 transversely extending longitudinally spaced parallel strips. In order to produce square pouches, the spacing between the adjacent edges 44c of the adhesive strips 44 is twice the spacing of adjacent edges 46c of the transverse adhesive strips 44 while the width of the two outer longitudinal strips 44a is one-half the width of the strips 44. In addition, the width of adhesive strips 46 is equal to the width of adhesive strips 44.

The sheet 12 with the angularly related groups of spaced parallel strips 44 and 46 continues to move along the path and the second web 18 is fed in juxtaposed relation to the first web with the strips of adhesive being disposed between the two sheets. The two webs 12 and 18 are then passed between the contact pressure rolls 30 to adhere the webs at the strips of adhesive.

Subsequently, the adhered webs are severed along lines 50 which are located in unadhered areas of the webs midway between each pair of longitudinally extending strips 44 and also along lines 52 midway between opposite edges of each longitudinal strip 44, except the outer strips, so as to simultaneously produce a plurality of ribbons, each having a plurality of pouches therein with the pouches being open to one edge of the ribbon. Stated another way, the severing or cutting lines between the respective pair of strips 44 are spaced an equal distance from the adjacent edges 44c of the strips while cutting lines 52 are spaced an equal distance from opposite edges of the strips.

Preferably, the cooperating rollers 32 and 34 also include means for severing or producing a score line and a second cut 55 midway between opposite edges of the transversely extending strips of adhesive 46. If score lines are produced, the score lines will weaken the webs between the opposite edges of each of the transversely extending strips to accommodate separation of adjacent pouches 54 from the continuous ribbons 56, while cutting will sever the ribbons into individual pouches.

FIG. 4 illustratively shows, one type of means for scoring the webs transversely of the path of movement. This includes a plurality of pins 60 on roller 32 which are received in the webs. However, any other means for weakening the sheets transversely of the path may be used. Of course, it will be appreciated that the webs need not be slit or scored prior to being wound on roll 39. In other instances it may be desirable to cut or sever the webs along the lines 55. In such instances, the pins and recesses 60, 62 would be replaced with a severing means.

A modified form of the invention is shown in FIG. 5 wherein the patterns of adhesive produced on the first web of material are of varying configuration conforming to different food products. For example, the food products would be in the form of meat products, such as fowl wings, fowl thighs, legs of lamb, etc. In addition, the food products could be in the form of pastries or other products.

In the embodiment of the invention shown in FIG. 5, two webs are interconnected along different adhesive patterns 70, 72, 74, 76, 78, and 80 that are produced at longitudinally and transversely spaced locations on the first web of material. The second web of material is then secured to the first web along all of the adhesive patterns and the webs are cut into ribbons by severing the two webs along lines 82 and 84 that extend generally parallel to the path of movement of webs, similar to the arrangement described above in connection with the embodiment shown in FIG. 2 and 3. Likewise, the webs are either scored or severed along transversely extending lines 86 that extend perpendicular to the path of movement of the webs so that the plural walled ribbons may be transformed into individual pouches. As can be seen from a inspection of FIG. 5, the adhesive patterns produced on the web are of irregular shape at transversely spaced locations which correspond to axially spaced locations on the rollers and the webs are severed along spaced lines extending parallel to the path of movement of the webs and are also either scored or severed generally around the outline of each of the adhesive patterns. The irregular shaped adhesive patterns between the two webs will allow for the formation of a plurality of ribbons, or plural walled members, each having a plurality of pouches of different configurations formed therein. These ribbons of pouches then can be individually packed and sold to the homeowner or meat and other food product packagers that can utilize the individual pouches for inserting products and sealing the opened end of the pouches.

In a preferred form of this embodiment of the invention, the respective webs of material would be a foil of aluminum and a polyester film that are interconnected along the adhesive patterns. The advantage of utilizing the two different materials is that the polyester film is transparent so that the packaged product is visible through the package and is stable at relatively high temperatures, while the aluminum foil has great heat transfer characteristics for utilization in baking or cooking the food product while it is maintained in the wrapper or enclosure defined by the pouch. An additional advantage of the foil of aluminum is that in folding the open end, after the food product has been inserted therein, the dead fold properties of aluminum allow the package to be sealed without utilizing any additional sealing techniques. Other alternatives, such as tie bands, could be utilized for enclosing the open end of the pouch after the article has been inserted therein.

A slightly further modified form of the invention is shown in FIG. 6 wherein the pouches that are formed are of varying size and configurations, similar to the configurations described in connection with the embodiment of FIG. 5. However, in this instance, the two webs would preferably be severed to immediately produce individual pouches. The severing or cutting could be preformed with rollers, similar to rollers 32 and 34 that have knife patterns corresponding to the pouch patterns produced on the adhesive roller 26. Alternatively, the cutting could be performed with cooperating dies.

As shown in FIG. 6, the pouches of different configurations are located in overlapping relation to each other and would be arranged in a manner to utilize the great majority of the web material, thereby keeping the waste of web material to a minimum. As in all of the previous embodiments, the pouches 90 would be of the open end type and with the web being severed along lines 92 that are transversely spaced between opposite edges 94 of the two webs. The webs would also be simultaneously severed around the entire periphery of each of the adhesive patterns 96 to produce the individual pouches.

Again, the pouches could be formed of two webs of dissimilar material, such as a foil of aluminum and a polyester or alternatively could be formed of two webs of polyester material which has great stability at high temperatures. With a proper utilization of an adhesive that could withstand temperatures on the order of 400° F. or greater, the pouches could be utilized for packaging material or food products that could be baked within the pouch or could be heated without being removed from its package, such as pastries that many times are heated in an oven before being served.

A still further modified form of the invention is shown in FIG. 7 and is in many respects similar to the embodiment shown in FIGS. 2 and 3. However, in this instance, the pouch is arranged slightly different within the ribbon of material. In the embodiment illustrated in FIG. 7, the adhesive receiving patterns produced on the roller 26 extend parallel and perpendicular to the axis of the roller. The adhesive receiving patterns that extend parallel to the axis of roller produce continuous patterns of adhesive 100 that extend perpendicular to the path of movement of the webs, generally designated by the arrow P in FIG. 7. The adhesive receiving patterns that extend perpendicular or circumferentially of the axis of the roller will result in the adhesive patterns 102. As can be seen from an inspection of FIG. 7, the patterns that extend perpendicular to the axis of the rollers are interrupted, at 104, adjacent one edge of each of the patterns 100 that extend perpendicular to the path of the webs to produce areas where the webs are free of interconnection to each other and these areas are located adjacent the open ends of the pouches in the final configuration. In the embodiment illustrated in FIG. 7, the two webs of material, after being adhered along the adhesive pattern, are again slit or cut along lines 106 extending parallel to the path of movement of the webs to produce a plurality of ribbons each having a plurality of pouches formed therein. In the embodiment of FIG. 7, the pouches are again of rectangular configuration but the open end of each pouch is located between opposite edges of the ribbon defined by the cuts 106.

Thus, the continuous ribbon of pouches may be severed transversely in the unadhered areas 104 of the webs to produce an open ended pouch. The extent of the unadhered area of the end portion of each pouch will be dependent upon its use.

For example, if the open ended pouch were to be utilized for inserting some product and then utilizing a standard tie arrangement, a considerable amount of unadhered material would be desirable. However, if the closure were to be in the form of a fold, wherein a metal foil constituted one web of material, the dead fold properties of the aluminum would allow to seal the enclosure with a minimum amount of material.

The advantage of this arrangement is that the two webs need not be scored or severed along transverse lines perpendicular to the path of movement of the web during its initial formation. The continuous ribbons or plural walled members could be rolled up onto a central core and packaged in a box having a serrated edge or other conventional means for allowing removal of individual pouches by severing the ribbons along the unadhered areas.

A slightly further modified form of the invention is shown in FIGS. 8 and 9 wherein a plurality of ribbons or plural walled members are again formed and capable of being readily transformed into individual sealed pouches. In the embodiment illustrated in FIGS. 8 and 9, the plural wall members are only interconnected initially along opposite edges of the ribbons and can subsequently be readily transformed into individual pouches. In this instance, the adhesive patterns are in the form of first patterns of adhesive 110 that extend generally parallel to the path of movement of the respective webs and second adhesive patterns 112 that extend perpendicular to the path of movement. In this embodiment, the adhesive patterns 110 are preferably in the form of adhesive means responsive to pressure while the second or transversely extending patterns 112 are preferably of a heat sensitive type of coating or adhesive means that requires heat and pressure to produce adhesion. Thus by utilizing pressure rollers to initially adhere the two webs, the webs are only interconnected along the adhesive means or patterns. Since the second adhesive means are responsive to heat sealing conditions to adhere to webs, there will be no connection transversely of the webs. The webs can then be severed into a plurality of ribbons by cutting generally between opposite edges of each of the adhesive patterns extending parallel to the path of movement of the webs. The resultant ribbons are only interconnected along opposite edges thereof.

The continuous ribbons may then be transformed into individual pouches by severing between opposite edges of the transverse adhesive patterns along lines 114. This will produce a short open ended sleeve having heat sensitive adhesive means on opposite ends thereof. An article to be packaged can be inserted into the sleeve and the sleeve sealed on both ends utilizing standard heat sealing techniques that are normally available in most places utilizing packaging of this type.

For example, the endless ribbons could readily be formed of at least one web of permeable material such as paper, and the second web could be polyester so that the ribbons could readily be transformed into pouches, after articles had been inserted therein, for utilization in medical places, such as hospitals. The packaged articles could then be sterilized in an autoclave.

An illustrative apparatus for producing the ribbons shown in FIG. 8 is schematically illustrated in FIG. 9 and includes a pair of webs of material 120 and 122 on roll form. A pair of adhesive applying means 124 and 126 similar to the adhesive applying means 20 are located in the path of the first web to produce a longitudinal and transversely extending adhesive patterns.

The first roller forming part of the adhesive applying means 124 would have adhesive receiving patterns that extend circumferentially around the roller at axially spaced locations and immersed in a solvent or water based adhesive in the container 130, which adhesive means will adhere upon application of pressure to the webs, while the second adhesive applying means 126 would include a roller having axially extending adhesive receiving patterns located thereon and immersed in a liquid heat sensitive coating located in container 132. The two rollers would then cooperate to produce the two adhesive patterns, namely, first adhesive means responsive to pressure that consists of spaced strips extending parallel to the path of the moving web of material 120 and a second plurality of spaced strips of adhesive means responsive to heat and pressure extending perpendicular to the path of the web.

The liquid solvent adhesive and coating are dried sufficiently by heater 134 to drive off sufficient solvents from the first adhesive means it makes it tacky and also the solvents of the second adhesive means. The two webs are pressed together by the pressure rollers 136 to interconnect the webs along the first adhesive strips or patterns extending parallel to the path of movement of the webs.

The webs could then be severed by suitable cutting means 140 along the lines 142 shown in FIG. 8 to produce a plurality of ribbons, each capable of being transformed into individual pouches. The ribbons could then be separated between opposite edges of each adhesive pattern 112 to form open ended sleeves convertible into sealed pouches by well known heat sealing techniques. If desired, the cutting means 140 could also produce score lines along the lines generally indicated at 114, so that the plural walled members could readily be severed from the endless ribbons.

The method of simultaneously producing a plurality of pouches may briefly be summarized as including the steps of applying localized areas of adhesive to a first web 12 with the adhesive applying means in the form of one or more rollers while the web is being moved along a path in a first direction. Thereafter, a second web 18 is fed in juxtaposed relation to the first web and the two webs are pressed into engagement with each other by passing between the spaced contact pressure rollers to adhere the webs along at least some of the localized areas of adhesive and produce two interconnected webs of plural walled members capable of being transformed into a plurality of pouches. The plural walled webs may subsequently be severed along longitudinally spaced lines and severed or scored along transverse lines to produce a plurality of ribbons each capable of being transformed into individual pouches, or the webs can be transformed into a plurality of pouches of different configurations.

As can be seen from the above description, the present invention eliminates the need for laminating or coating a non-heat sealable material prior to being utilized for side wall of a pouch. In fact, the present invention allows for the use of different types of material for the two side walls while still being able to rapidly produce the pouches in a single process. In all embodiments, either one or both of the sheets or webs forming the ultimate side walls for the pouch may be any combination of materials such as paper, matallic foils, various plastic sheets or polyester films, etc.

It will, of course, be appreciated that the configuration of the pouch is not limited to the patterns shown. For example, the interior open space of the pouch could take many other designs, such as a triangle, the form of a Christmas tree, etc. In addition, if desired, the adhesive applied to the web could be colored and the various colors could be utilized as indicia codes for the product to be inserted therein and/or the manufacturer of the product.

While not intending to limit the invention in any manner whatsoever, the specific examples of forming pouches from two webs of dissimilar or different materials having non-heat sealable characteristics will now be described. Utilizing a web of polyester of terephthalic acid and a paper web, respectively, the two webs may be bonded together by applying an acrylic base adhesive, such as Pittsburgh Plate and Glass Company, Adhesive Division, No. P-531 adhesive, to the localized areas to produce predetermined patterns and the webs are then severed and/or scored between opposite edges of some of the localized areas of adhesive and between adjacent edges of at least some of the adjacent pair of strips. A web of polyester of terephthalic acid and a web of aluminum foil could form the respective side walls of pouches and the adhesive in this instance would be a polyester base adhesive, such as DuPont No. 46982.

It will be appreciated that the present invention thus allows for the formation of pouches from a similar or different material for the respective side walls and in which the pouch may be formed in a single process at speeds substantially greater than heretofore known. In addition, the present process permits making pouches having different seam strength by merely selecting the proper adhesive.

What is claimed is:

1. A cooking and sterilizing bag and bag roll comprising a pair of films secured together at least at two opposite edges, one film being a plastic film capable of resisting cooking temperatures, the other film being a metallic foil, and an adhesive securing the opposite edges together which adhesive is capable of withstanding cooking temperatures without separation of the films.

2. A cooking and sterilizing bag and bag roll as in claim 1 in which the plastic film is transparent.

3. A cooking and sterilizing bag and bag roll as in claim 1 in which the plastic film is polyester plastic and the foil is aluminum.

4. A cooking sterilizing bag and bag roll as in claim 1 in which a third edge of the bag is adhesively secured together.

* * * * *